US011711480B2

(12) United States Patent
Kamoi

(10) Patent No.: US 11,711,480 B2
(45) Date of Patent: Jul. 25, 2023

(54) INFORMATION FORWARDING DEVICE FORWARDING INFORMATION STORED IN PREDETERMINED FOLDER TO PRESET DESTINATION AND NON-TRANSITORY COMPUTER READABLE MEDIUM

(71) Applicant: FUJIFILM Business Innovation Corp., Tokyo (JP)

(72) Inventor: Yusuke Kamoi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 262 days.

(21) Appl. No.: 16/559,656

(22) Filed: Sep. 4, 2019

(65) Prior Publication Data

US 2020/0092437 A1 Mar. 19, 2020

(30) Foreign Application Priority Data

Sep. 14, 2018 (JP) ................................. 2018-172991

(51) Int. Cl.
*H04N 1/32* (2006.01)

(52) U.S. Cl.
CPC ......... *H04N 1/3239* (2013.01); *H04N 1/3208* (2013.01); *H04N 1/32096* (2013.01); *H04N 1/32406* (2013.01)

(58) Field of Classification Search
None
See application file for complete search history.

(56) References Cited

U.S. PATENT DOCUMENTS

| 5,844,969 | A | * | 12/1998 | Goldman | H04L 51/14 709/200 |
| 8,345,332 | B2 | * | 1/2013 | Kakigi | H04N 1/00347 358/1.9 |
| 9,060,066 | B2 | | 6/2015 | Kondo | |
| 2003/0206314 | A1 | * | 11/2003 | Tanimoto | G06Q 10/10 709/201 |
| 2008/0089341 | A1 | * | 4/2008 | Inui | H04N 1/32069 358/1.15 |

(Continued)

FOREIGN PATENT DOCUMENTS

| JP | 2001203871 | | 7/2001 |
| JP | 2015041874 | | 3/2015 |
| KR | 20070008458 | A * | 1/2007 |

OTHER PUBLICATIONS

KR-10-2007-0008458 English Translation, p. 3, 4th paragraph to p. 4, 4th paragraph (Year: 2007).*

(Continued)

*Primary Examiner* — Miya J Williams
(74) *Attorney, Agent, or Firm* — JCIPRNET

(57) ABSTRACT

An information forwarding device includes a forwarding unit, a reception unit, and a control unit. The forwarding unit forwards information stored in a predetermined folder to a preset destination. The reception unit receives an edit to a destination stored in advance. In a case in which the reception unit receives an edit to a destination set as a forwarding destination of the forwarding by the forwarding unit, the control unit executes control to defer of the forwarding of the information by the forwarding unit to the destination after the edit until a predetermined condition is satisfied.

14 Claims, 12 Drawing Sheets

(56) References Cited

U.S. PATENT DOCUMENTS

| | | | |
|---|---|---|---|
| 2011/0176161 A1* | 7/2011 | Matsumoto | G06F 3/1203 |
| | | | 358/1.14 |
| 2014/0085661 A1* | 3/2014 | Nakajo | H04N 1/00925 |
| | | | 358/1.14 |
| 2018/0013915 A1* | 1/2018 | Tajima | H04N 1/0022 |

OTHER PUBLICATIONS

"Office Action of Japan Counterpart Application", dated May 31, 2022, with English translation thereof, pp. 1-6.

* cited by examiner

INFORMATION FORWARDING DEVICE FORWARDING INFORMATION STORED IN PREDETERMINED FOLDER TO PRESET DESTINATION AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-172991 filed Sep. 14, 2018.

BACKGROUND

(i) Technical Field

The present disclosure relates to an information forwarding device and a non-transitory computer readable medium.

(ii) Related Art

Japanese Unexamined Patent Application Publication No. 2015-41874 proposes a data communication device including a forwarding function, and a related control method. Specifically, a list of stored destinations are displayed on a display, and when setting the forwarding function, a destination to act as the forwarding destination is selected from the list of destinations, and whether or not to restrict editing of the destination selected as the forwarding destination is set. Additionally, when a destination to edit is selected from the list of displayed destinations, it is also determined whether or not the destination to edit is set as the forwarding destination and also whether or not the editing restriction is set for the forwarding destination. If it is determined that the destination to edit is set as the forwarding destination and also that the editing restriction is set for the forwarding destination, editing of the destination to edit is restricted.

SUMMARY

In the case in which forwarding is set, since erroneous transmission may occur if the destination is edited, editing of the destination may be restricted, but the inability to edit the destination may impair convenience in some cases. Aspects of non-limiting embodiments of the present disclosure relate to suppressing the forwarding of information to a destination whose validity is not confirmed, even in the case in which the destination is edited in a state in which forwarding is set.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information forwarding device including: a forwarding unit that forwards information stored in a predetermined folder to a preset destination; a reception unit that receives an edit to a destination stored in advance; and a control unit that, in a case in which the reception unit receives an edit to a destination set as a forwarding destination of the forwarding by the forwarding unit, executes control to defer of the forwarding of the information by the forwarding unit to the destination after the edit until a predetermined condition is satisfied.

BRIEF DESCRIPTION OF THE DRAWINGS

Exemplary embodiments of the present disclosure will be described in detail based on the following figures, wherein.

DETAILED DESCRIPTION

Figure 1:
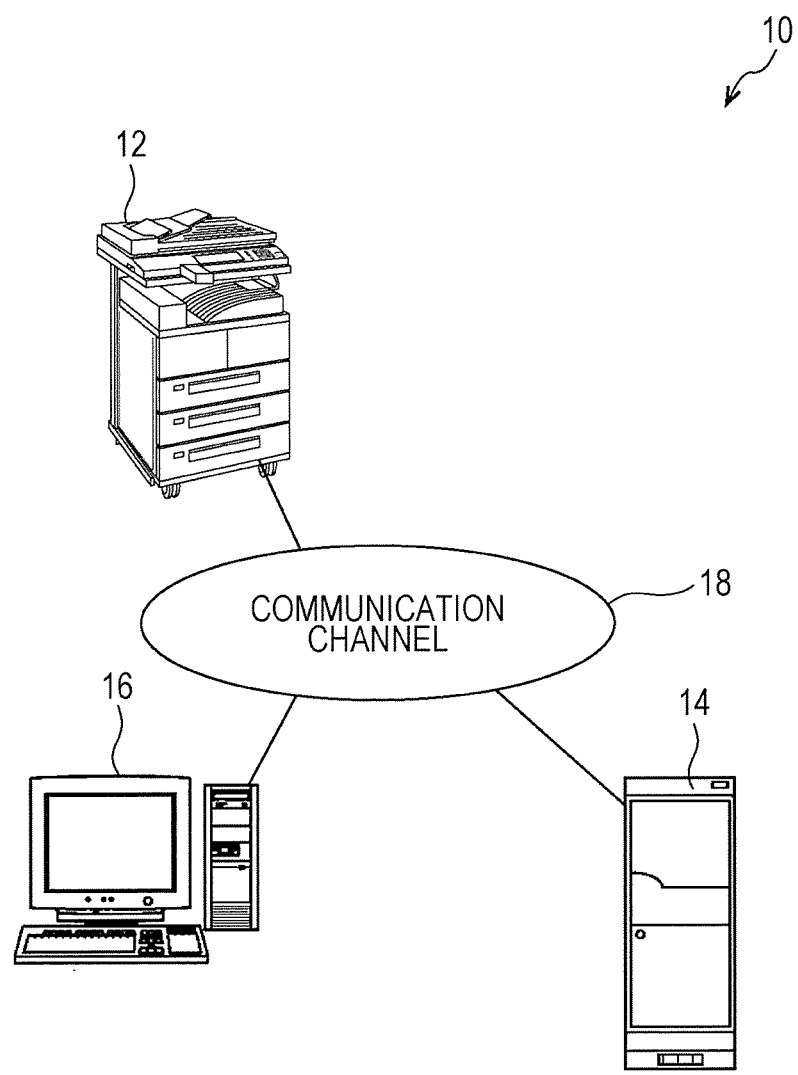
FIG. 1 is a diagram illustrating a schematic configuration of an information processing system including an image forming device according to the exemplary embodiments.

Hereinafter, exemplary embodiments of the present disclosure will be described in detail and with reference to the drawings. Note that the exemplary embodiments are described by taking as an example the case of applying the information forwarding device to an image forming device including multiple service functions, such as a facsimile function, an image reading function, an image forming function, a storing function of storing image information and the like, and a transmission function of transmitting image information and the like. FIG. 1 is a diagram illustrating a schematic configuration of an information processing system including an image forming device 12 according to the exemplary embodiments.

As illustrated in FIG. 1, an information processing system 10 according to the exemplary embodiments is provided with the image forming device 12, a server 14, and an information processing device 16. Note that in the exemplary embodiments, only one of each of the image forming device 12, the server 14, and the information processing device 16 is illustrated, but multiple instances of each of the devices may also be provided.

The image forming device 12, the server 14, and the information processing device 16 are connected to each other via a communication channel 18 such as a local area network (LAN), a wide area network (WAN), the Internet, or an intranet. Additionally, each of the image forming device 12, the server 14, and the information processing device 16 is capable of bidirectionally transmitting and receiving various data over the communication channel 18.

Figure 2:
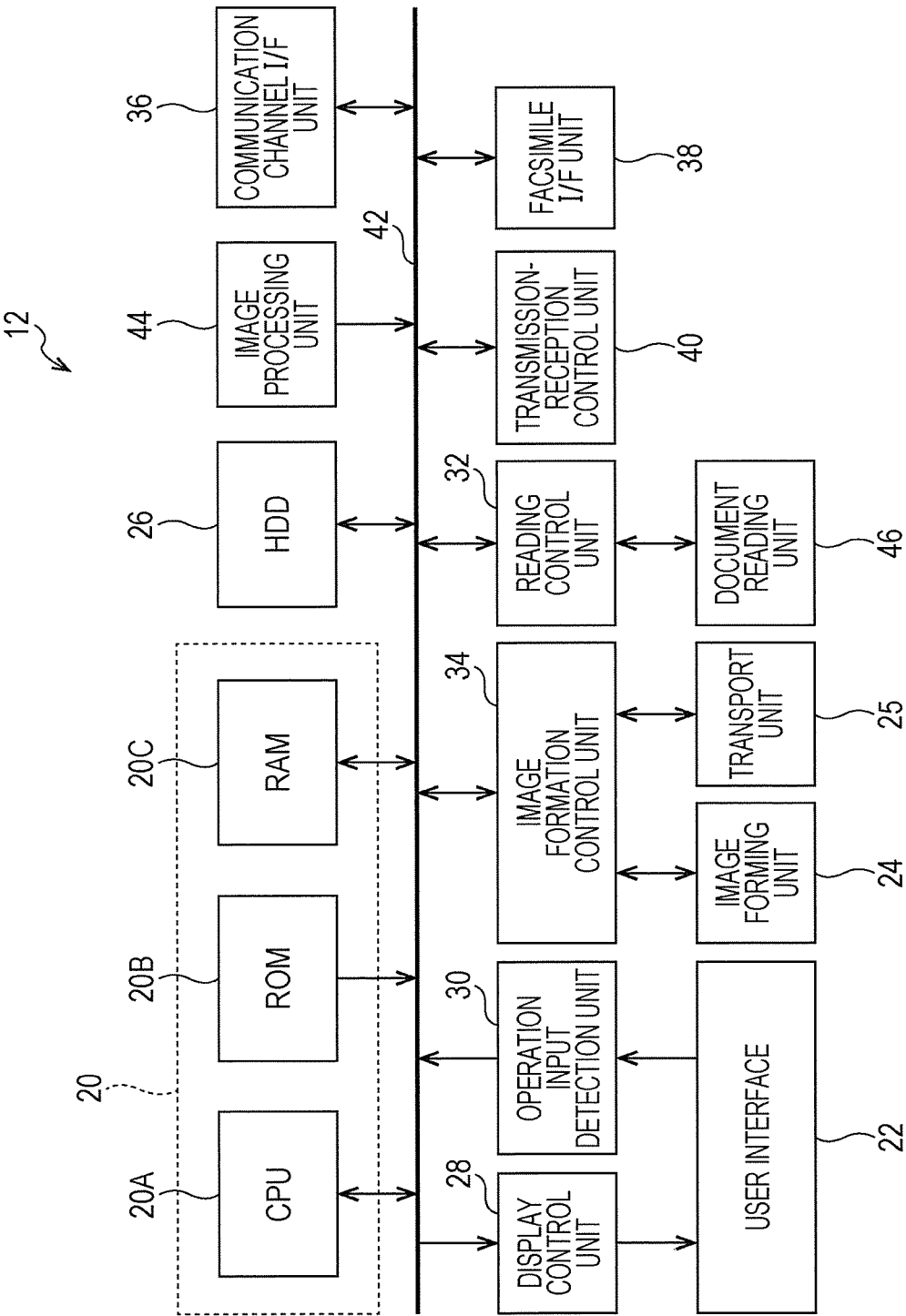
FIG. 2 is a block diagram illustrating a schematic configuration of an electrical system in the image forming device according to the exemplary embodiments.

FIG. 2 is a block diagram illustrating a schematic configuration of an electrical system in the image forming device 12 according to the exemplary embodiments.

As illustrated in FIG. 2, the image forming device 12 according to the exemplary embodiments is provided with a control unit 20 including a central processing unit (CPU) 20A, read-only memory (ROM) 20B, and random access memory (RAM) 20C. The CPU 20A administers the overall operation of the image forming device 12. The RAM 20C is used as a work area or the like when the CPU 20A executes various programs. The ROM 20B stores information such as various control programs and various parameters in advance. Additionally, in the image forming device 12, each component of the control unit 20 is connected electrically by a system bus 42.

Meanwhile, the image forming device 12 according to the exemplary embodiments is provided with a hard disk drive (HDD) 26 that stores various data, application programs, and the like. Also, the image forming device 12 is provided with a display control unit 28 that is connected to a user interface 22 and that controls the display of various operating screens and the like on a display of the user interface 22. Also, the image forming device 12 is provided with an operation input detection unit 30 that is connected to the user interface 22 and that detects operation instructions input through the user interface 22. Additionally, in the image forming device 12, the HDD 26, the display control unit 28, and the operation input detection unit 30 are connected electrically to the system bus 42. Note that in the image forming device 12 according to the exemplary embodiments, an example of providing the HDD 26 is described, but the configuration is not limited thereto, and a non-volatile storage unit such as flash memory may also be provided.

Also, the image forming device 12 according to the exemplary embodiments is provided with a reading control unit 32 that controls an operation of reading an optical image with a document reading unit 46 and an operation of feeding a document with a document transport unit, and with an image formation control unit 34 that controls an image forming process by the image forming unit 24 and the transport of paper to the image forming unit 24 by a transport unit 25. Also, the image forming device 12 is provided with a communication channel interface (communication channel I/F) unit 36 that is connected to the communication channel 18 and that transmits and receives communication data with other external devices such as the server 14 connected to the communication channel 18, and an image processing unit 44 that performs various image processing. Also, the image forming device 12 is provided with a facsimile interface (facsimile I/F) unit 38 that is connected to a telephone line not illustrated and that transmits and receives facsimile data with a facsimile device connected to the telephone line. Also, the image forming device 12 is provided with a transmission-reception control unit 40 that controls the transmission and reception of facsimile data through the facsimile interface unit 38. Also, in the image forming device 12, the transmission-reception control unit 40, the reading control unit 32, the image formation control unit 34, the communication channel interface unit 36, the facsimile interface unit 38, and the image processing unit 44 are connected electrically to the system bus 42.

According to the above configuration, in the image forming device 12 according to the exemplary embodiments, access to each of the RAM 20C, the ROM 20B, and the HDD 26 is executed by the CPU 20A. Also, in the image forming device 12, control of the display of operating screens and information such as various messages on a display of the user interface 22 through the display control unit 28 is executed by the CPU 20A. Also, in the image forming device 12, control of the workings of the document reading unit 46 and the document transport unit through the reading control unit 32 is executed by the CPU 20A. Also, in the image forming device 12, control of the workings of the image forming unit 24 and the transport unit 25 through the image formation control unit 34 and control of the transmission and reception of communication data through the communication channel interface unit 36 are executed by the CPU 20A. Also, in the image forming device 12, control of the transmission and reception of facsimile data through the facsimile interface unit 38 by the transmission-reception control unit 40 is executed by the CPU 20A. Furthermore, in the image forming device 12, the CPU 20A ascertains operation content in the user interface 22 based on operation information detected by the operation input detection unit 30, and executes various types of control based on the operation content.

Figure 3:
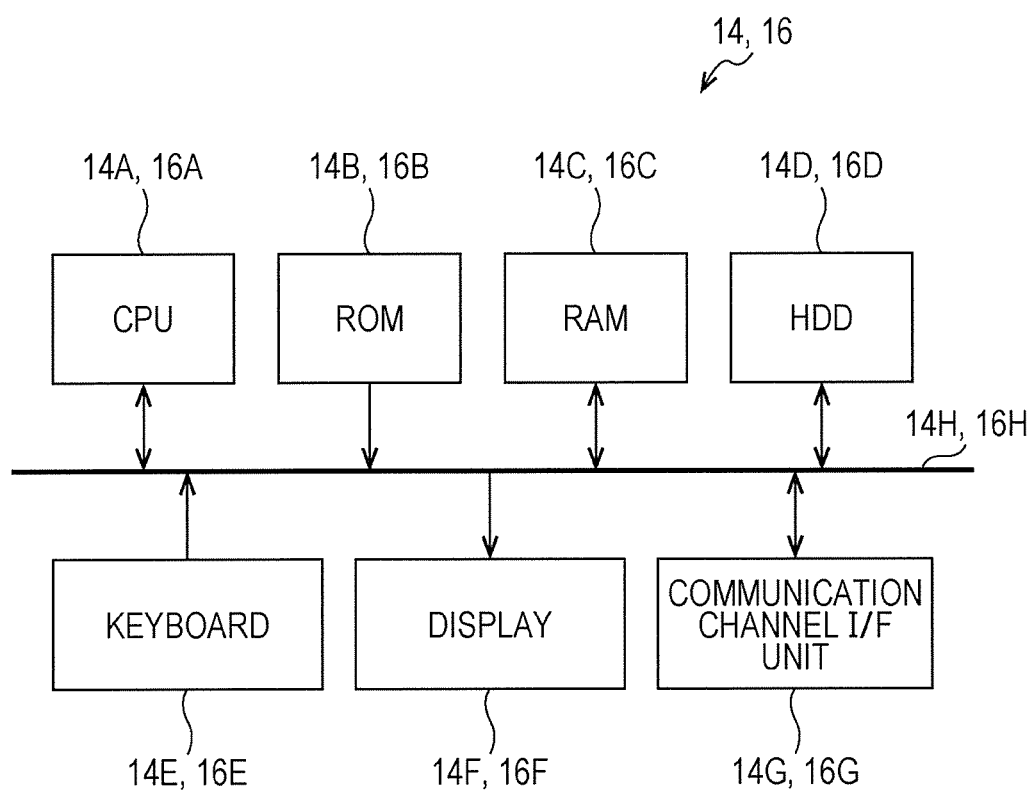
FIG. 3 is a block diagram illustrating a schematic configuration of an electrical system in a server and the information processing device according to the exemplary embodiments.

Next, a schematic configuration of an electrical system in the server 14 and the information processing device 16 according to the exemplary embodiments will be described. FIG. 3 is a block diagram illustrating a schematic configuration of an electrical system in the server 14 and the information processing device 16 according to the exemplary embodiments. Note that since the server 14 and the information processing device 16 basically take the configuration of a typical computer, the server 14 will be described as a representative example.

As illustrated in FIG. 3, the server 14 according to the exemplary embodiments is provided with a CPU 14A, ROM 14B, RAM 14C, an HDD 14D, a keyboard 14E, a display 14F, and a communication channel interface (I/F) unit 14G. The CPU 14A administers the overall operation of the server 14. The ROM 14B stores information such as various control programs and various parameters in advance. The RAM 14C is used as a work area or the like when the CPU 14A executes various programs. The HDD 14D stores various data, application programs, and the like. Note that in the server 14, the HDD 14D functions as storage 16D that acts as a storage unit storing information. The keyboard 14E is used to input various information. The display 14F is used to display various information. The communication channel interface unit 14G is connected to the communication channel 18, and transmits and receives various data with other devices connected to the communication channel 18. The above components of the server 14 are electrically interconnected by a system bus 14H. Note that in the server 14 according to the exemplary embodiments, an example of providing the HDD 14D is described, but the configuration is not limited thereto, and another non-volatile storage unit such as flash memory may also be provided.

According to the above configuration, in the server 14 according to the exemplary embodiments, access to the ROM 14B, the RAM 14C, and the HDD 14D, the acquisition of various data through the keyboard 14E, and the display of various information on the display 14F are executed by the CPU 14A. Also, in the server 14, control of the transmission and reception of communication data through the communication channel interface unit 14G is executed by the CPU 14A.

In the image forming device 12 configured as above, destinations for the transmission and reception of information using facsimile, email, and the like are registered and managed in a destination table. When a user transmits information, by selecting a destination from the destination table, the burden of inputting the destination every time is reduced.

Also, the image forming device 12 is provided with a forwarding function that forwards received facsimile information to a predetermined destination without outputting onto paper to reduce paper output and raise awareness of security concerns, or forwards transmitted facsimile information to a predetermined destination to be managed as a history.

In the case in which the forwarding function is set, it is conceivable that a destination may be edited by a general user, and the forwarding destination may change unintentionally.

Accordingly, in the case of receiving an edit to a destination set as a forwarding destination, the exemplary embodiments are configured to defer forwarding until a predetermination condition is satisfied.

First Exemplary Embodiment

Figure 4:
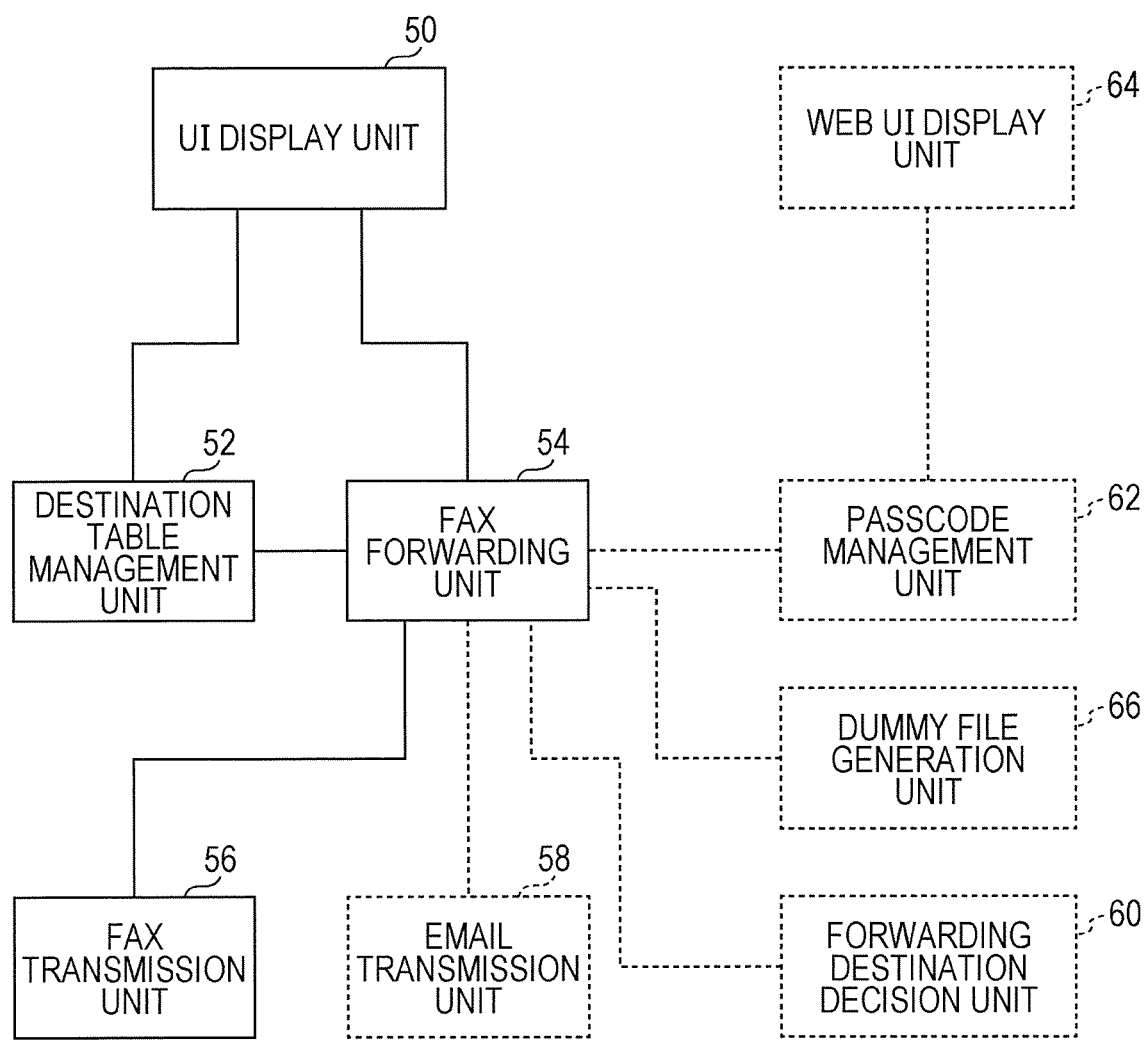
FIG. 4 is a function block diagram illustrating functions provided in a control unit of the image forming device according to the exemplary embodiments.

At this point, specific functions provided in the control unit 20 of the image forming device 12 according to the first exemplary embodiment will be described. FIG. 4 is a function block diagram illustrating functions provided in the control unit 20 of the image forming device 12 according to the present exemplary embodiment. Note that functions denoted by dashed lines indicate functions provided in subsequent exemplary embodiments.

The control unit 20 is provided with the functions of a user interface (UI) display unit 50 that acts as a reception unit, a destination table management unit 52, a facsimile (fax) forwarding unit 54 that acts as a forwarding unit and control unit, and a fax transmission unit 56.

The UI display unit 50 controls the display of information such as various messages on the display of the user interface 22 through the display control unit 28. Also, the UI display unit 50 receives operation instructions input through the user interface 22 detected by the operation input detection unit 30. In the present exemplary embodiment, the UI display unit 50 receives an edit of a destination managed by the destination table management unit 52 and the like as an operation instruction.

The destination table management unit 52 manages destinations for the transmission and reception of information using facsimile, email, and the like as a destination table stored in the HDD 26. Also, the destination table management unit 52 manages forwarding destinations in the case of transmitting and receiving facsimiles. Also, the destination table management unit 52 receives operations performed on the user interface 22 by a user and receives edits to destinations in the destination table and the like.

In the case of transmitting or receiving a facsimile, the fax forwarding unit 54 forwards the transmitted or received information to a preset forwarding destination managed by the destination table management unit 52. Specifically, a folder used to transmit or receive facsimiles is provided on the HDD 26 as a folder to use for forwarding, and in the case in which information transmitted or received by facsimile is stored in the folder, the information stored in the folder is forwarded to a forwarding destination preset in correspondence with the folder. In addition, in the case in which the destination table management unit 52 receives an edit to a destination set as a forwarding destination, the fax forwarding unit 54 defers the forwarding of information.

In the case in which a user operates the user interface 22 or the like to give an instruction to transmit a facsimile, the fax transmission unit 56 transmits the facsimile through the facsimile I/F unit 38. Also, when transmitting a facsimile, the fax forwarding unit 54 is notified. Specifically, the information to be transmitted by facsimile is stored in the folder for forwarding on the HDD 26. With this arrangement, the fax forwarding unit 54 is notified of the facsimile transmission and forwards the information to be transmitted by facsimile to a forwarding destination preset in correspondence with the folder.

Figure 5:
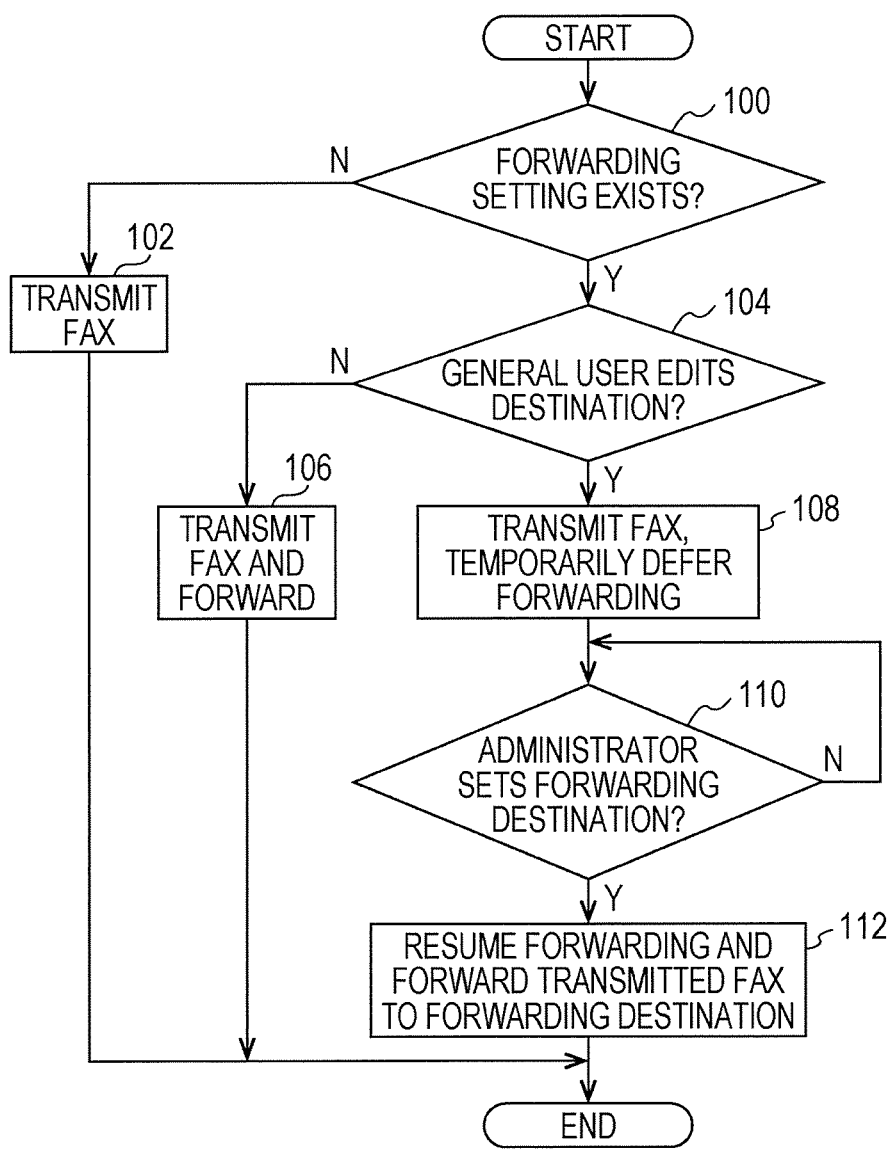
FIG. 5 is a flowchart illustrating one example of a flow of processes during facsimile transmission performed by the image forming device according to a first exemplary embodiment.

Next, specific processes during facsimile transmission performed by the image forming device 12 according to the first exemplary embodiment configured as described above will be described. FIG. 5 is a flowchart illustrating one example of a flow of processes during facsimile transmission performed by the image forming device 12 according to the present exemplary embodiment. Note that the processes in FIG. 5 are assumed to be started in the case in which a user operates the user interface 22 to give an instruction to transmit a facsimile.

In step 100, the fax forwarding unit 54 determines whether or not a forwarding setting that forwards information transmitted by facsimile has been set in advance. This determination determines whether or not the forwarding destination to use during facsimile transmission is preset using the destination table. If the determination is negative, the flow proceeds to step 102, whereas if positive, the flow proceeds to step 104.

In step 102, the CPU 20A transmits, through the facsimile I/F unit 38, information representing an image read by the document reading unit 46 to the destination designated by the user operating the user interface 22, and the series of processes ends.

In step 104, the destination table management unit 52 determines whether or not a general user has edited a destination. In this determination, the destination table management unit 52 determines whether or not an operation instruction received by the UI display unit 50 is an edit of the destination table. If the determination is negative, the flow proceeds to step 106, whereas if positive, the flow proceeds to step 108.

In step 106, the fax transmission unit 56 transmits a facsimile through the facsimile I/F unit 38, and also notifies the fax forwarding unit 54 of the facsimile transmission. Subsequently, the fax forwarding unit 54 forwards the information transmitted by facsimile to the preset forwarding destination, and the series of processes ends. In other words, the fax transmission unit 56 transmits a facsimile and stores the information transmitted by facsimile to the folder for forwarding, while the fax forwarding unit 54 receives the notification of the facsimile transmission and forwards the information transmitted by facsimile to the forwarding destination preset in correspondence with the folder.

In step 108, the fax transmission unit 56 transmits a facsimile through the facsimile I/F unit 38 and also notifies the fax forwarding unit 54, the fax forwarding unit 54 temporarily defers the forwarding of the information transmitted by facsimile, and the flow proceeds to step 110. In other words, the fax transmission unit 56 transmits a facsimile, stores the information transmitted by facsimile in the folder for forwarding, and the fax forwarding unit 54 temporarily defers the forwarding of the information stored in the folder.

In step 110, the destination table management unit 52 determines whether or not a forwarding destination has been set by an administrator. This determination determines whether or not the UI display unit 50 has received an operation performed by the administrator and a forwarding destination has been set using the destination table managed by the destination table management unit 52. The flow stands by until the determination is positive, and then proceeds to step 112.

In step 112, the fax forwarding unit 54 resumes forwarding, forwards the information transmitted by facsimile to the set forwarding destination, and the series of processes ends.

Second Exemplary Embodiment

Next, the image forming device according to the second exemplary embodiment will be described. In the first exemplary embodiment, in the case in which the destination set as the forwarding destination during facsimile transmission is edited, forwarding is deferred until the forwarding destination is set, but in the second exemplary embodiment, after deferring forwarding, an email notification indicating that forwarding has been deferred is sent to the information processing device 16 of the administrator. Also, in the case in which a forwarding destination is not set for a fixed period after sending the email notification, the old forwarding destination before the edit is registered as a different destination, and forwarding is resumed. In other words, the functions of the email transmission unit 58 and the forwarding destination decision unit 60 illustrated with dashed lines in FIG. 4 are additionally provided in the control unit 20.

In the case in which the fax forwarding unit 54 defers forwarding, the email transmission unit 58 transmits information such as a message indicating that forwarding has been deferred to the information processing device 16 of the administrator by email. With this arrangement, the administrator is informed that the destination has been edited by a general user and forwarding has been deferred.

In the case in which a forwarding destination is not set for a fixed period after transmitting the email, the forwarding destination decision unit 60 registers the old forwarding destination before the edit as a different destination, and decides that the old forwarding destination is the forwarding destination.

Figure 6:
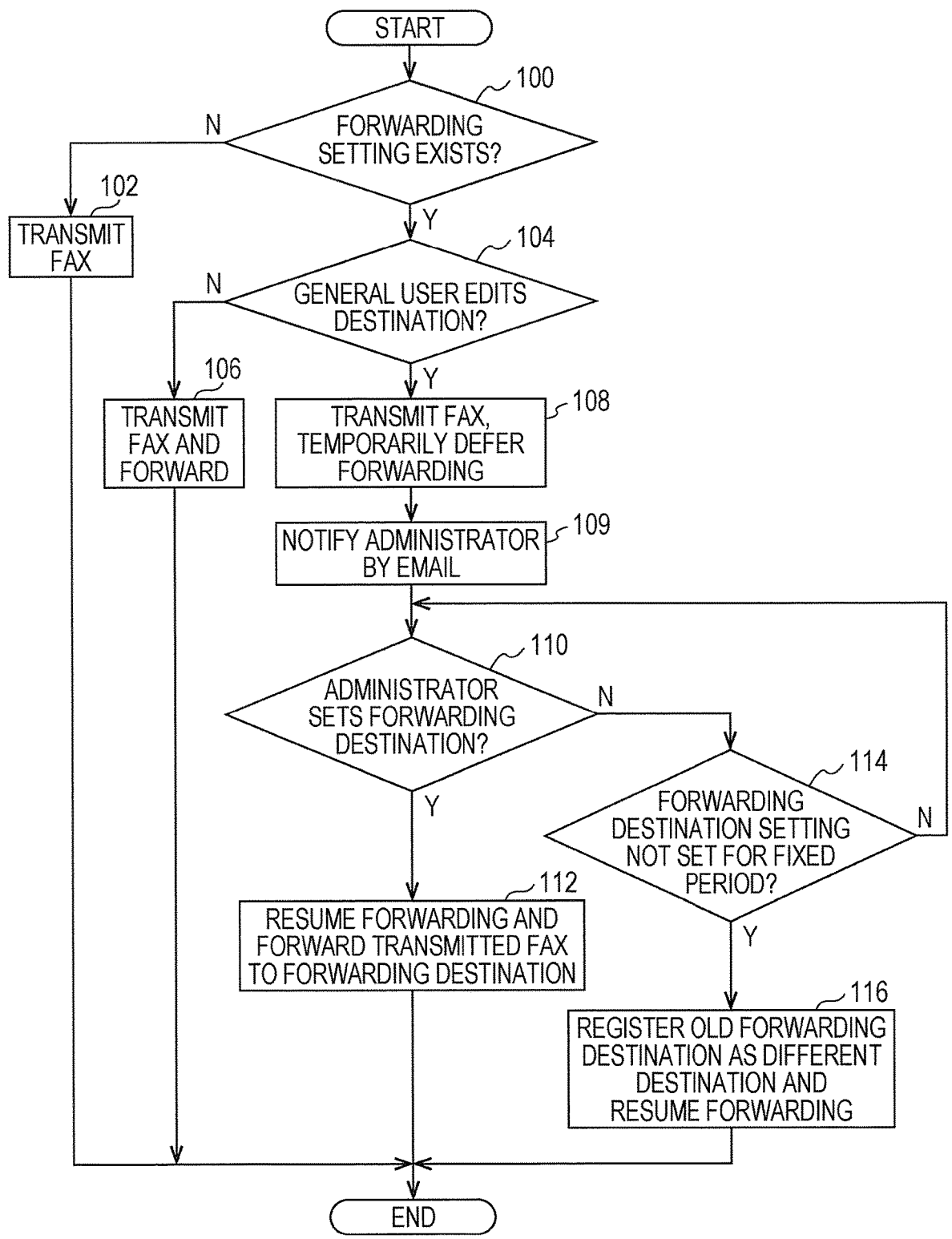
FIG. 6 is a flowchart illustrating one example of a flow of processes during facsimile transmission performed by the image forming device according to a second exemplary embodiment.

Next, specific processes during facsimile transmission performed by the image forming device 12 according to the present exemplary embodiment will be described. FIG. 6 is a flowchart illustrating one example of a flow of processes during facsimile transmission performed by the image forming device 12 according to the present exemplary embodiment. Note that the processes in FIG. 6 are assumed to be started in the case in which a user operates the user interface 22 to give an instruction to transmit a facsimile. Also, processes which are the same as FIG. 5 will be denoted with and described using the same signs.

In step 100, the fax forwarding unit 54 determines whether or not a forwarding setting that forwards information transmitted by facsimile has been set in advance. This determination determines whether or not the forwarding destination to use during facsimile transmission is preset using the destination table. If the determination is negative, the flow proceeds to step 102, whereas if positive, the flow proceeds to step 104.

In step 102, the CPU 20A transmits, through the facsimile I/F unit 38, information representing an image read by the document reading unit 46 to the destination designated by the user operating the user interface 22, and the series of processes ends.

In step 104, the destination table management unit 52 determines whether or not a general user has edited a destination. In this determination, the destination table management unit 52 determines whether or not an operation instruction received by the UI display unit 50 is an edit of the destination table. If the determination is negative, the flow proceeds to step 106, whereas if positive, the flow proceeds to step 108.

In step 106, the fax transmission unit 56 transmits a facsimile through the facsimile I/F unit 38, and also notifies the fax forwarding unit 54 of the facsimile transmission. Subsequently, the fax forwarding unit 54 forwards the information transmitted by facsimile to the preset forwarding destination, and the series of processes ends. In other words, the fax transmission unit 56 transmits a facsimile and stores the information transmitted by facsimile to the folder for forwarding, while the fax forwarding unit 54 receives the notification of the facsimile transmission and forwards the information transmitted by facsimile to the forwarding destination preset in correspondence with the folder.

In step 108, the fax transmission unit 56 transmits a facsimile through the facsimile I/F unit 38 and also notifies the fax forwarding unit 54, the fax forwarding unit 54 temporarily defers the forwarding of the information transmitted by facsimile, and the flow proceeds to step 109. In other words, the fax transmission unit 56 transmits a facsimile, stores the information transmitted by facsimile in the folder for forwarding, and the fax forwarding unit 54 temporarily defers the forwarding of the information stored in the folder.

In step 109, the email transmission unit 58 sends an email notification by transmitting information such as a message indicating that forwarding has been deferred to the information processing device 16 of the administrator by email, and the flow proceeds to step 110.

In step 110, the destination table management unit 52 determines whether or not a forwarding destination has been set by an administrator. This determination determines whether or not the UI display unit 50 has received an operation performed by the administrator and a forwarding destination has been set using the destination table managed by the destination table management unit 52. If the determination is positive, the process proceeds to step 112, whereas if negative, the process proceeds to step 114.

In step 112, the fax forwarding unit 54 resumes forwarding, forwards the information transmitted by facsimile to the set forwarding destination, and the series of processes ends.

On the other hand, in step 114, the destination table management unit 52 determines if no forwarding destination has been set for a predetermined fixed period since the transmission of the email. If the determination is negative, the flow returns to step 110 and the processes described above are repeated, whereas if the determination is positive, the flow proceeds to step 116.

In step 116, the forwarding destination decision unit 60 registers the old forwarding destination before the edit as a different destination, resumes forwarding with the old forwarding destination set as the forwarding destination, and the series of processes ends.

Third Exemplary Embodiment

Next, the image forming device according to the third exemplary embodiment will be described. In the first exemplary embodiment, in the case in which the destination set as the forwarding destination during facsimile transmission is edited, forwarding itself is deferred until the forwarding destination is set, but in the third exemplary embodiment, forwarding to the new forwarding destination after the edit is deferred while forwarding to the old forwarding destination before the edit is executed. Also, after forwarding to the old forwarding destination, an email indicating that forwarding to the new forwarding destination has been deferred and forwarding to the old forwarding destination has been executed is transmitted to the information processing device 16 of the administrator. Also, in the case in which a forwarding destination is not set for a fixed period after transmitting the email, the old forwarding destination before the edit is registered as a different destination and also forwarded to the old forwarding destination. In other words, similarly to the second exemplary embodiment, the functions of the email transmission unit 58 and the forwarding destination decision unit 60 illustrated with dashed lines in FIG. 4 are additionally provided in the control unit 20 of the first exemplary embodiment.

In the case in which the fax forwarding unit 54 executes forwarding to the old forwarding destination before the edit, the email transmission unit 58 transmits information, such as a message indicating that forwarding to the old forwarding destination before the edit has been executed while forwarding to the new forwarding destination has been deferred, to the information processing device 16 of the administrator by email. With this arrangement, the administrator is informed that the destination has been edited by a general user and forwarding to the old forwarding destination has been executed, while forwarding to the new forwarding destination has been deferred.

In the case in which a forwarding destination is not set for a fixed period after transmitting the email, the forwarding destination decision unit 60 registers the old forwarding destination before the edit as a different destination, and decides that the forwarding destination from now on is the old forwarding destination.

Figure 7:
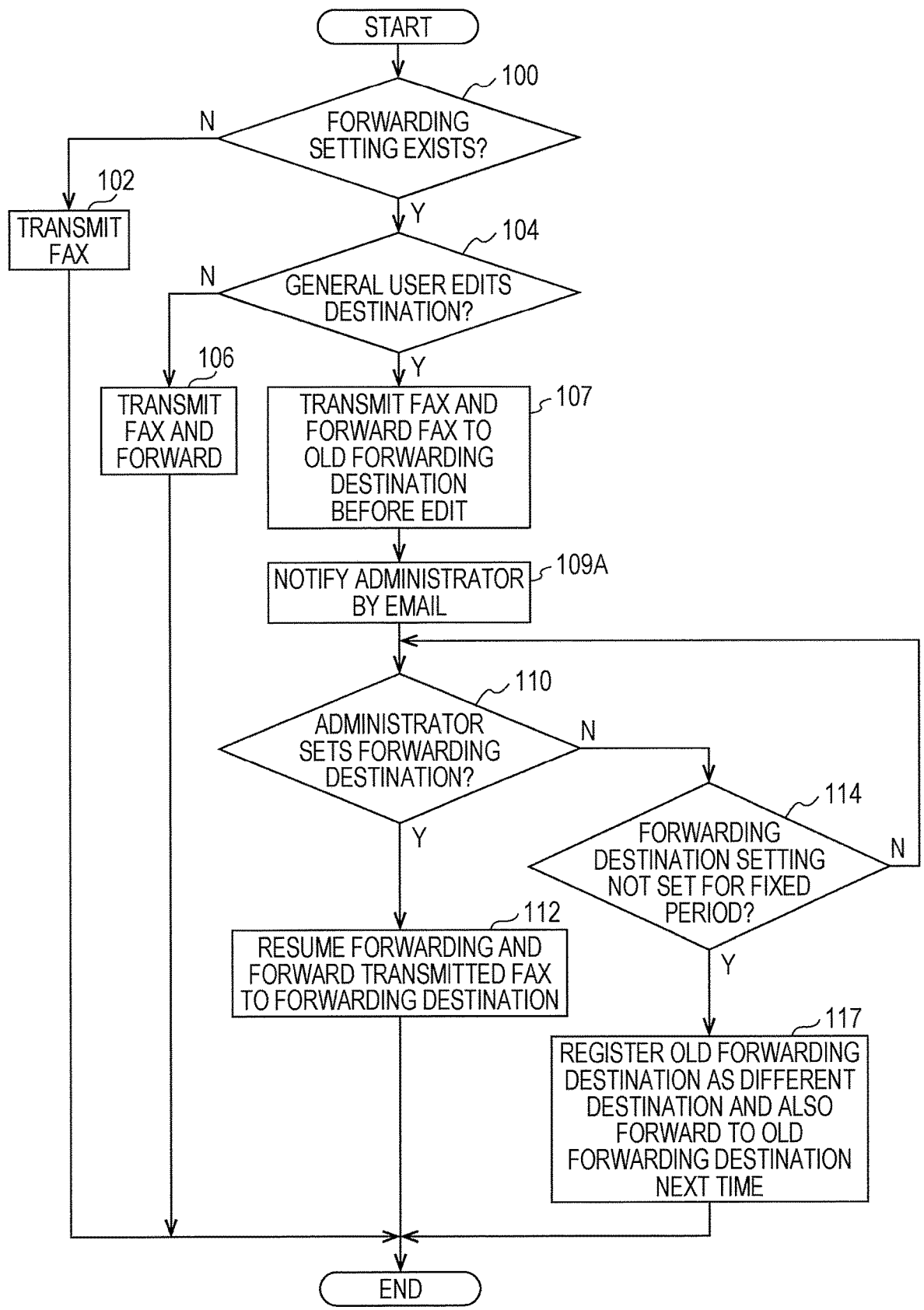
FIG. 7 is a flowchart illustrating one example of a flow of processes during facsimile transmission performed by the image forming device according to a third exemplary embodiment.

Next, specific processes during facsimile transmission performed by the image forming device 12 according to the present exemplary embodiment will be described. FIG. 7 is a flowchart illustrating one example of a flow of processes during facsimile transmission performed by the image forming device 12 according to the present exemplary embodiment. Note that the processes in FIG. 7 are assumed to be started in the case in which a user operates the user interface 22 to give an instruction to transmit a facsimile. Also, processes which are the same as FIGS. 5 and 6 will be denoted with and described using the same signs.

In step 100, the fax forwarding unit 54 determines whether or not a forwarding setting that forwards information transmitted by facsimile has been set in advance. This determination determines whether or not the forwarding destination to use during facsimile transmission is preset using the destination table. If the determination is negative, the flow proceeds to step 102, whereas if positive, the flow proceeds to step 104.

In step 102, the CPU 20A transmits, through the facsimile I/F unit 38, information representing an image read by the document reading unit 46 to the destination designated by the user operating the user interface 22, and the series of processes ends.

In step 104, the destination table management unit 52 determines whether or not a general user has edited a destination. In this determination, the destination table management unit 52 determines whether or not an operation instruction received by the UI display unit 50 is an edit of the destination table. If the determination is negative, the flow proceeds to step 106, whereas if positive, the flow proceeds to step 107.

In step 106, the fax transmission unit 56 transmits a facsimile through the facsimile I/F unit 38, and also notifies the fax forwarding unit 54 of the facsimile transmission. Subsequently, the fax forwarding unit 54 forwards the information transmitted by facsimile to the preset forwarding destination, and the series of processes ends. In other words, the fax transmission unit 56 transmits a facsimile and stores the information transmitted by facsimile to the folder for forwarding, while the fax forwarding unit 54 receives the notification of the facsimile transmission and forwards the information transmitted by facsimile to the forwarding destination preset in correspondence with the folder.

In step 107, the fax transmission unit 56 transmits a facsimile through the facsimile I/F unit 38, and also notifies the fax forwarding unit 54 of the facsimile transmission. Subsequently, the fax forwarding unit 54 transmits the information transmitted by facsimile to the old forwarding destination before the edit, and the flow proceeds to step 109A. In other words, the fax transmission unit 56 transmits a facsimile, stores the information transmitted by facsimile in the folder for forwarding, and the fax forwarding unit 54 temporarily defers the forwarding of the information stored in the folder to the new forwarding destination after the edit.

In step 109A, the email transmission unit 58 sends an email notification by transmitting information, such as a message indicating that forwarding to the old forwarding destination before the edit has been performed while forwarding to the new forwarding destination has been deferred, to the information processing device 16 of the administrator by email, and the flow proceeds to step 110.

In step 110, the destination table management unit 52 determines whether or not a forwarding destination has been set by an administrator. This determination determines whether or not the UI display unit 50 has received an operation performed by the administrator and a forwarding destination has been set using the destination table managed by the destination table management unit 52. If the determination is positive, the process proceeds to step 112, whereas if negative, the process proceeds to step 114.

In step 112, the fax forwarding unit 54 resumes forwarding, forwards the information transmitted by facsimile to the set forwarding destination, and the series of processes ends.

On the other hand, in step 114, the destination table management unit 52 determines if no forwarding destination has been set for a predetermined fixed period since the transmission of the email. If the determination is negative, the flow returns to step 110 and the processes described above are repeated, whereas if the determination is positive, the flow proceeds to step 117.

In step 117, the forwarding destination decision unit 60 registers the old forwarding destination before the edit as a different destination, decides that the old forwarding destination is the forwarding destination, sets the old forwarding destination as the destination to forward to from now on, and the series of processes ends.

Fourth Exemplary Embodiment

Next, the image forming device according to the fourth exemplary embodiment will be described. In the second exemplary embodiment, after forwarding is deferred, an email indicating that forwarding has been deferred is transmitted to the information processing device 16 of the administrator, but in the fourth exemplary embodiment, after forwarding is deferred, an email stating a passcode as code information is transmitted to the information processing device 16 of the administrator or the like. Subsequently, forwarding is resumed in the case in which the passcode is set by the administrator via a user interface using a communication channel such as a network (hereinafter designated a web UI).

In the present exemplary embodiment, the passcode management unit 62 and the web UI display unit 64 illustrated with dashed lines in FIG. 4 are additionally provided with respect to the second exemplary embodiment.

When the fax forwarding unit 54 defers forwarding, the passcode management unit 62 sets a passcode for resuming forwarding and notifies the email transmission unit 58 of the set passcode and a Uniform Resource Locator (URL) for inputting the passcode, and the email transmission unit 58 transmits the passcode and the URL to the information processing device 16 of the administrator by email.

In the case in which the administrator accesses the URL communicated to the information processing device 16, the web UI display unit 64 displays a screen for inputting the passcode, and receives the passcode. Also, in the case of receiving the passcode, the web UI display unit 64 notifies the fax forwarding unit 54 to resume forwarding, and the fax forwarding unit 54 resumes forwarding to the new forwarding destination after the edit.

Figure 8:
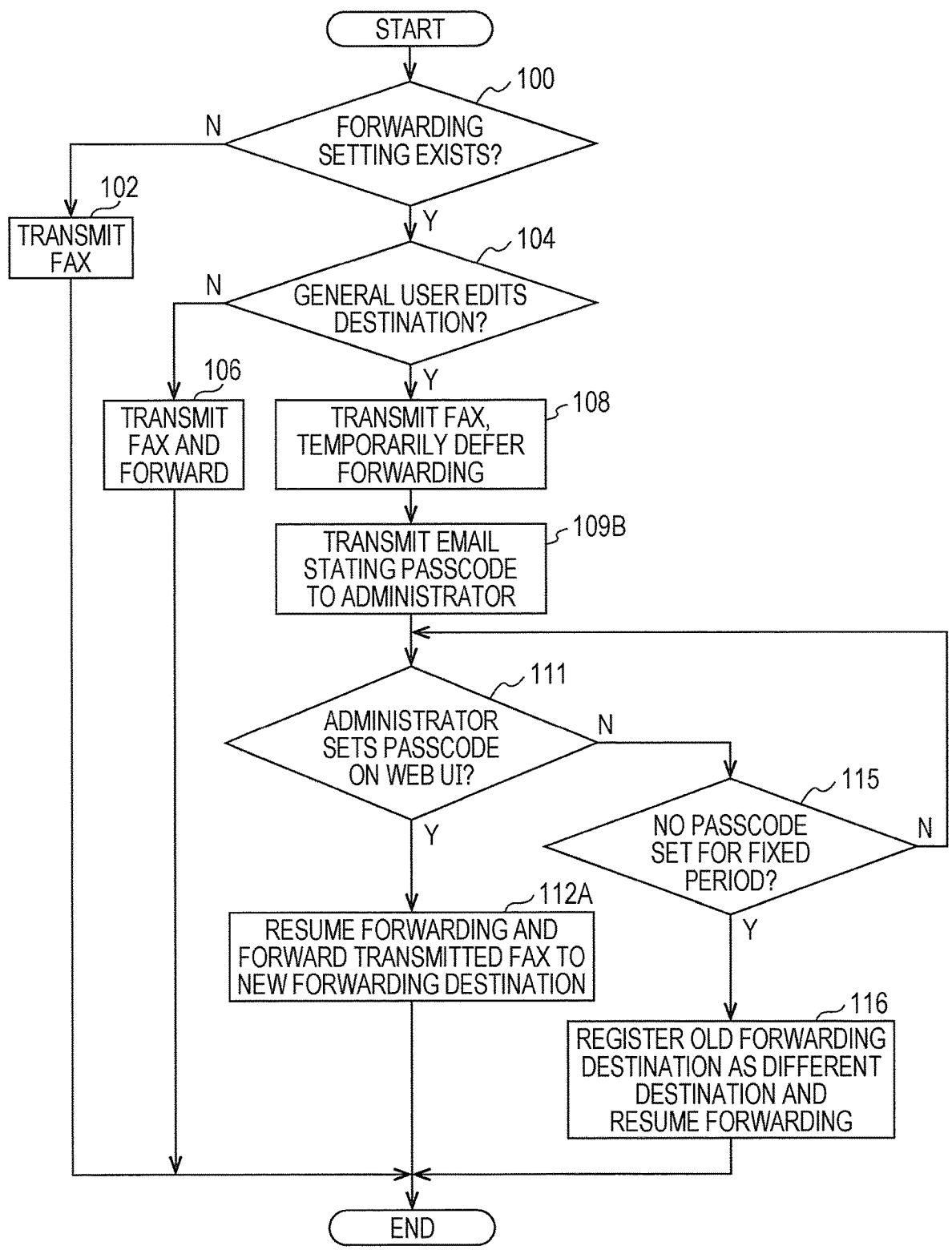
FIG. 8 is a flowchart illustrating one example of a flow of processes during facsimile transmission performed by the image forming device according to a fourth exemplary embodiment.

Next, specific processes during facsimile transmission performed by the image forming device 12 according to the present exemplary embodiment will be described. FIG. 8 is a flowchart illustrating one example of a flow of processes during facsimile transmission performed by the image forming device 12 according to the present exemplary embodiment. Note that the processes in FIG. 8 are assumed to be started in the case in which a user operates the user interface 22 to give an instruction to transmit a facsimile. Also, processes which are the same as FIGS. 5 to 7 will be denoted with and described using the same signs.

In step 100, the fax forwarding unit 54 determines whether or not a forwarding setting that forwards information transmitted by facsimile has been set in advance. This determination determines whether or not the forwarding destination to use during facsimile transmission is preset using the destination table. If the determination is negative, the flow proceeds to step 102, whereas if positive, the flow proceeds to step 104.

In step 102, the CPU 20A transmits, through the facsimile I/F unit 38, information representing an image read by the document reading unit 46 to the destination designated by the user operating the user interface 22, and the series of processes ends.

In step 104, the destination table management unit 52 determines whether or not a general user has edited a destination. In this determination, the destination table management unit 52 determines whether or not an operation instruction received by the UI display unit 50 is an edit of the destination table. If the determination is negative, the flow proceeds to step 106, whereas if positive, the flow proceeds to step 108.

In step 106, the fax transmission unit 56 transmits a facsimile through the facsimile I/F unit 38, and also notifies the fax forwarding unit 54 of the facsimile transmission. Subsequently, the fax forwarding unit 54 forwards the information transmitted by facsimile to the preset forwarding destination, and the series of processes ends. In other words, the fax transmission unit 56 transmits a facsimile and stores the information transmitted by facsimile to the folder for forwarding, while the fax forwarding unit 54 receives the notification of the facsimile transmission and forwards the information transmitted by facsimile to the forwarding destination preset in correspondence with the folder.

In step 108, the fax transmission unit 56 transmits a facsimile through the facsimile I/F unit 38 and also notifies the fax forwarding unit 54, the fax forwarding unit 54 temporarily defers the forwarding of the information transmitted by facsimile, and the flow proceeds to step 109B. In other words, the fax transmission unit 56 transmits a facsimile, stores the information transmitted by facsimile in the folder for forwarding, and the fax forwarding unit 54 temporarily defers the forwarding of the information stored in the folder.

In step 109B, the email transmission unit 58 sends an email notification by transmitting a passcode for resuming forwarding to the information processing device 16 of the administrator by email, and the flow proceeds to step 111. In other words, the passcode management unit 62 sets a passcode for resuming forwarding by the fax forwarding unit 54, and notifies the email transmission unit 58 of the set passcode and a URL for inputting the passcode. Subsequently, the email transmission unit 58 transmits the passcode and the URL to the information processing device 16 of the administrator by email.

In step 111, the passcode management unit 62 determines whether or not the passcode has been set by the administrator using the web UI. If the determination is positive, the process proceeds to step 112A, whereas if negative, the process proceeds to step 115.

In step 112A, the fax forwarding unit 54 resumes forwarding, forwards the information transmitted by facsimile to the new forwarding destination after the edit, and the series of processes ends.

On the other hand, in step 115, the passcode management unit 62 determines if no passcode has been set for a predetermined fixed period since the transmission of the email. This determination determines whether or not a passcode has been set to determine whether or not a forwarding destination has been set. If the determination is negative, the flow returns to step ill and the processes described above are repeated, whereas if the determination is positive, the flow proceeds to step 116.

In step 116, the forwarding destination decision unit 60 registers the old forwarding destination before the edit as a different destination, resumes forwarding with the old forwarding destination set as the forwarding destination, and the series of processes ends.

Fifth Exemplary Embodiment

Next, the image forming device according to the fifth exemplary embodiment will be described. In the fourth exemplary embodiment, after forwarding is deferred, an email stating a passcode is transmitted to the information processing device 16 of the administrator or the like, but in the fifth exemplary embodiment, forwarding is deferred only for the new forwarding destination after the edit, information is forwarded to the old forwarding destination, and an email is transmitted to the information processing device of the administrator.

In the present exemplary embodiment, the control unit 20 is provided with the same functions as the fourth exemplary embodiment, and in the case in which a destination set as the forwarding destination is edited, the fax forwarding unit 54 defers forwarding to the new forwarding destination after the edit, and forwards information to the old forwarding destination.

Figure 9:
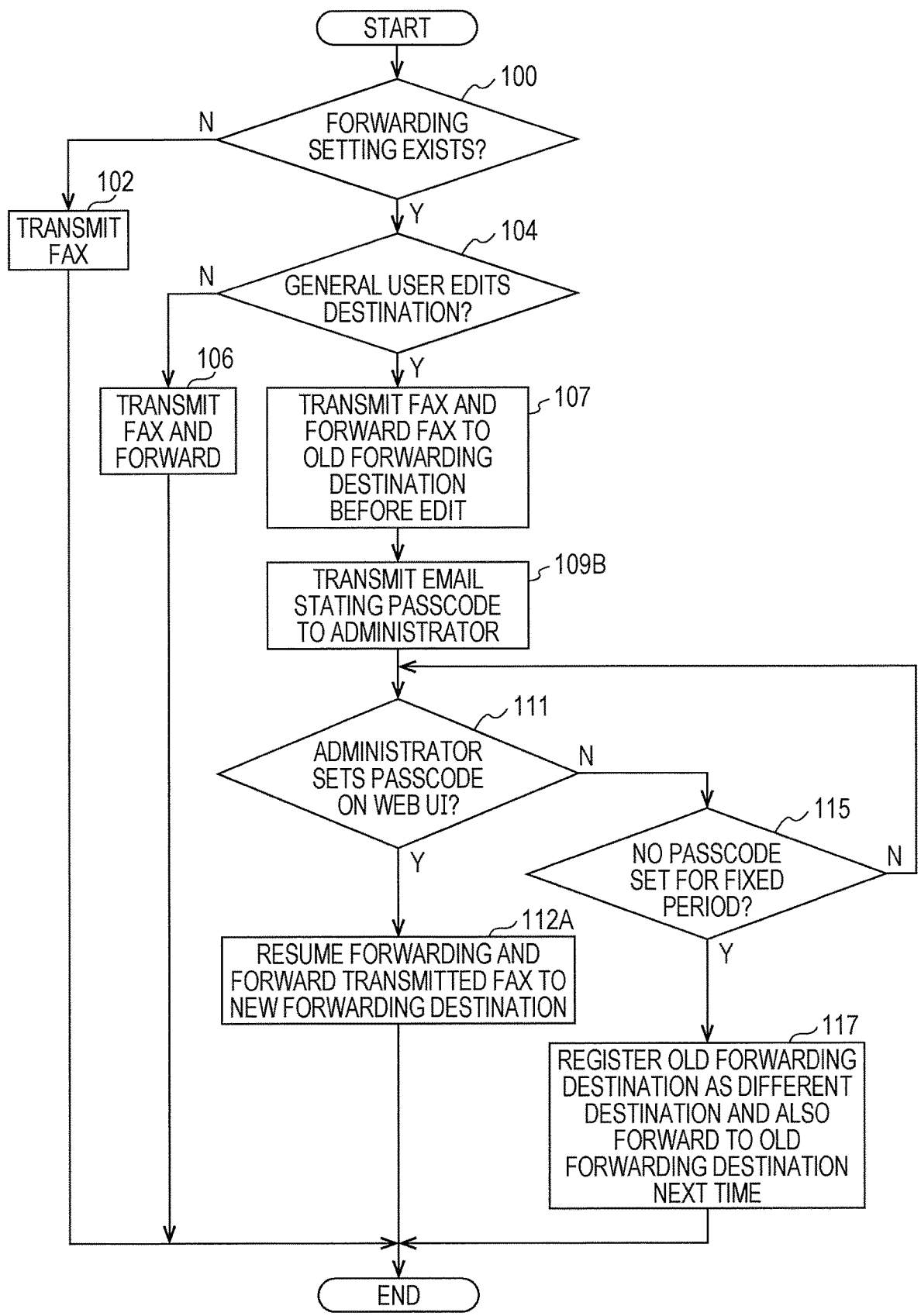
FIG. 9 is a flowchart illustrating one example of a flow of processes during facsimile transmission performed by the image forming device according to a fifth exemplary embodiment.

Next, specific processes during facsimile transmission performed by the image forming device 12 according to the present exemplary embodiment will be described. FIG. 9 is a flowchart illustrating one example of a flow of processes during facsimile transmission performed by the image forming device 12 according to the present exemplary embodiment. Note that the processes in FIG. 9 are assumed to be started in the case in which a user operates the user interface 22 to give an instruction to transmit a facsimile. Also, processes which are the same as FIGS. 5 to 8 will be denoted with and described using the same signs.

In step 100, the fax forwarding unit 54 determines whether or not a forwarding setting that forwards information transmitted by facsimile has been set in advance. This determination determines whether or not the forwarding destination to use during facsimile transmission is preset using the destination table. If the determination is negative, the flow proceeds to step 102, whereas if positive, the flow proceeds to step 104.

In step 102, the CPU 20A transmits, through the facsimile I/F unit 38, information representing an image read by the document reading unit 46 to the destination designated by the user operating the user interface 22, and the series of processes ends.

In step 104, the destination table management unit 52 determines whether or not a general user has edited a destination. In this determination, the destination table management unit 52 determines whether or not an operation instruction received by the UI display unit 50 is an edit of the destination table. If the determination is negative, the flow proceeds to step 106, whereas if positive, the flow proceeds to step 107.

In step 106, the fax transmission unit 56 transmits a facsimile through the facsimile I/F unit 38, and also notifies the fax forwarding unit 54 of the facsimile transmission. Subsequently, the fax forwarding unit 54 forwards the information transmitted by facsimile to the preset forwarding destination, and the series of processes ends. In other words, the fax transmission unit 56 transmits a facsimile and stores the information transmitted by facsimile to the folder for forwarding, while the fax forwarding unit 54 receives the notification of the facsimile transmission and forwards the information transmitted by facsimile to the forwarding destination preset in correspondence with the folder.

In step 107, the fax transmission unit 56 transmits a facsimile through the facsimile I/F unit 38, and also notifies the fax forwarding unit 54 of the facsimile transmission. Subsequently, the fax forwarding unit 54 transmits the information transmitted by facsimile to the old forwarding destination before the edit, and the flow proceeds to step 109B. In other words, the fax transmission unit 56 transmits a facsimile, stores the information transmitted by facsimile in the folder for forwarding, and the fax forwarding unit 54 temporarily defers the forwarding of the information stored in the folder to the new forwarding destination after the edit.

In step 109B, the email transmission unit 58 sends an email notification by transmitting a passcode for resuming forwarding to the information processing device 16 of the administrator by email, and the flow proceeds to step 111. In other words, the passcode management unit 62 sets a passcode for resuming forwarding by the fax forwarding unit 54, and notifies the email transmission unit 58 of the set passcode and a URL for inputting the passcode. Subsequently, the email transmission unit 58 transmits the passcode and the URL to the information processing device 16 of the administrator by email.

In step 111, the passcode management unit 62 determines whether or not the passcode has been set by the administrator using the web UI. If the determination is positive, the process proceeds to step 112A, whereas if negative, the process proceeds to step 115.

In step 112A, the fax forwarding unit 54 resumes forwarding, forwards the information transmitted by facsimile to the new forwarding destination after the edit, and the series of processes ends.

On the other hand, in step 115, the passcode management unit 62 determines if no passcode has been set for a predetermined fixed period since the transmission of the email. This determination determines whether or not a passcode has been set to determine whether or not a forwarding destination has been set. If the determination is negative, the flow returns to step 111 and the processes described above are repeated, whereas if the determination is positive, the flow proceeds to step 117.

In step 117, the forwarding destination decision unit 60 registers the old forwarding destination before the edit as a different destination, decides that the old forwarding destination is the forwarding destination, sets the old forwarding destination as the destination to forward to from now on, and the series of processes ends.

Sixth Exemplary Embodiment

Next, the image forming device according to the sixth exemplary embodiment will be described. In the fifth exemplary embodiment, forwarding to the old forwarding destination before the edit is executed, forwarding to the new forwarding destination after the edit is deferred, and a passcode is transmitted to the information processing device 16, but in the sixth exemplary embodiment, the original information is held without being forwarding, and a dummy file is forwarded to the old forwarding destination.

In the present exemplary embodiment, the control unit 20 additionally is provided with the dummy file generation unit 66 illustrated with dashed lines in FIG. 4 with respect to the fifth exemplary embodiment.

In the case in which a destination is edited by a general user in a state in which forwarding is set, a dummy file including information indicating that the forwarding destination has been changed and a passcode for resuming forwarding is generated.

Figure 10:
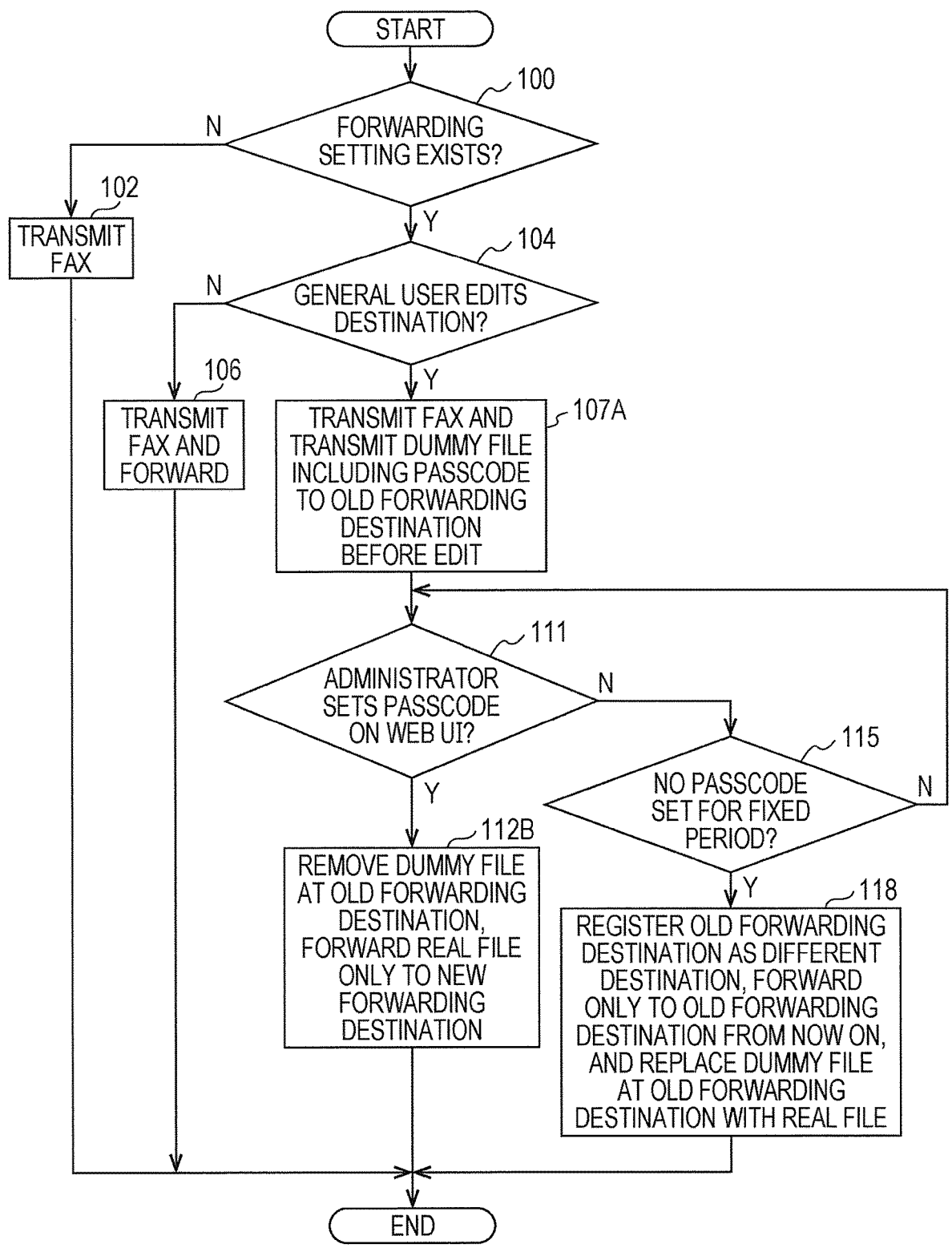
FIG. 10 is a flowchart illustrating one example of a flow of processes during facsimile transmission performed by the image forming device according to a sixth exemplary embodiment.

Next, specific processes during facsimile transmission performed by the image forming device 12 according to the present exemplary embodiment will be described. FIG. 10 is a flowchart illustrating one example of a flow of processes during facsimile transmission performed by the image forming device 12 according to the present exemplary embodiment. Note that the processes in FIG. 10 are assumed to be started in the case in which a user operates the user interface 22 to give an instruction to transmit a facsimile. Also, processes which are the same as FIGS. 5 to 9 will be denoted with and described using the same signs.

In step 100, the fax forwarding unit 54 determines whether or not a forwarding setting that forwards information transmitted by facsimile has been set in advance. This determination determines whether or not the forwarding destination to use during facsimile transmission is preset using the destination table. If the determination is negative, the flow proceeds to step 102, whereas if positive, the flow proceeds to step 104.

In step 102, the CPU 20A transmits, through the facsimile I/F unit 38, information representing an image read by the document reading unit 46 to the destination designated by the user operating the user interface 22, and the series of processes ends.

In step 104, the destination table management unit 52 determines whether or not a general user has edited a destination. In this determination, the destination table management unit 52 determines whether or not an operation instruction received by the UI display unit 50 is an edit of the destination table. If the determination is negative, the flow proceeds to step 106, whereas if positive, the flow proceeds to step 107A.

In step 106, the fax transmission unit 56 transmits a facsimile through the facsimile I/F unit 38, and also notifies the fax forwarding unit 54 of the facsimile transmission. Subsequently, the fax forwarding unit 54 forwards the information transmitted by facsimile to the preset forwarding destination, and the series of processes ends. In other words, the fax transmission unit 56 transmits a facsimile and stores the information transmitted by facsimile to the folder for forwarding, while the fax forwarding unit 54 receives the notification of the facsimile transmission and forwards the information transmitted by facsimile to the forwarding destination preset in correspondence with the folder.

In step 107A, the fax transmission unit 56 transmits a facsimile through the facsimile I/F unit 38, and also notifies the fax forwarding unit 54 of the facsimile transmission. Subsequently, the fax forwarding unit 54 transmits a dummy file including a passcode to the old forwarding destination before the edit, and the flow proceeds to step 111. In other words, the fax transmission unit 56 transmits a facsimile, and stores the information transmitted by facsimile in the folder for forwarding. Also, the dummy file generation unit 66 generates a dummy file including information indicating that the forwarding destination has been changed and a passcode for resuming forwarding, and the fax forwarding unit 54 forwards the dummy file generated by the dummy file generation unit 66 to the old forwarding destination.

In step 111, the passcode management unit 62 determines whether or not the passcode has been set by the administrator using the web UI. If the determination is positive, the process proceeds to step 112B, whereas if negative, the process proceeds to step 115.

In step 112B, the fax forwarding unit 54 removes, over the communication channel 18, the dummy file forwarded to the old forwarding destination, forwards the real file (the information transmitted by facsimile) only to the new forwarding destination after the edit, and the series of processes ends.

On the other hand, in step 115, the passcode management unit 62 determines if no passcode has been set for a predetermined fixed period since the transmission of the email. This determination determines whether or not a passcode has been set to determine whether or not a forwarding destination has been set. If the determination is negative, the flow returns to step 111 and the processes described above are repeated, whereas if the determination is positive, the flow proceeds to step 118.

In step 118, the forwarding destination decision unit 60 registers the old forwarding destination before the edit as a different destination, decides that the old forwarding destination is the forwarding destination, sets only the old forwarding destination as the destination to forward to from now on, and the series of processes ends. In other words, from now on, the dummy file forwarded to the old forwarding destination is replaced with the real file and forwarded.

Seventh Exemplary Embodiment

Next, the image forming device according to the sixth exemplary embodiment will be described. In the sixth exemplary embodiment, the real information is held without being forwarded and a dummy file is forwarded to the old forwarding destination, but in the seventh exemplary embodiment, a dummy file is also forwarded to the new forwarding destination after the edit, and the real information is held without being forwarded.

In the present exemplary embodiment, the control unit 20 is provided with the same functions as in the sixth exemplary embodiment, and when the destination is edited in a state in which a forwarding destination is set and the forwarding of the real file is deferred, the fax forwarding unit 54 forwards a dummy file to both the old and new forwarding destinations from both before and after the edit.

Figure 11:
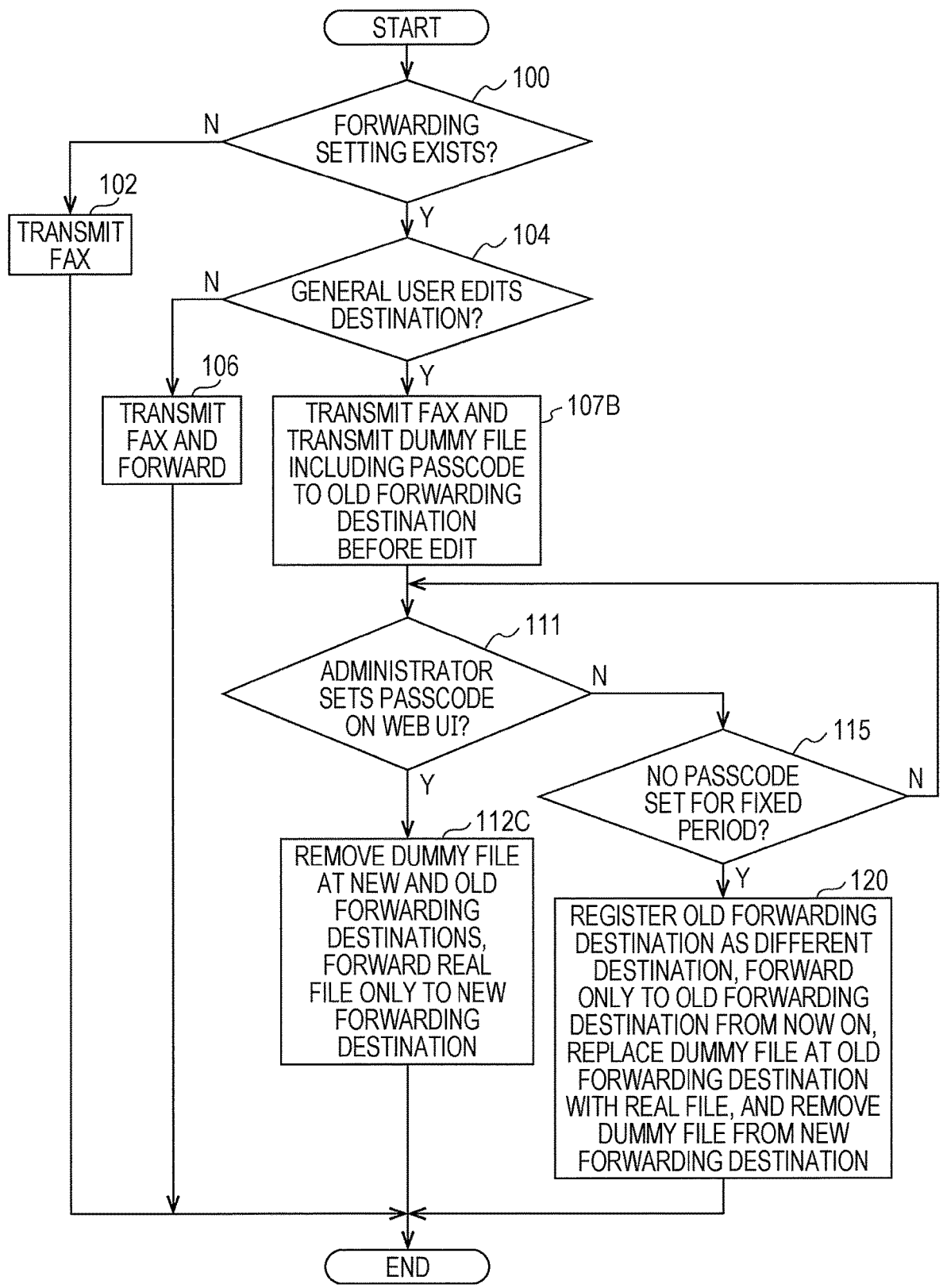
FIG. 11 is a flowchart illustrating one example of a flow of processes during facsimile transmission performed by the image forming device according to a seventh exemplary embodiment.

Next, specific processes during facsimile transmission performed by the image forming device 12 according to the present exemplary embodiment will be described. FIG. 11 is a flowchart illustrating one example of a flow of processes during facsimile transmission performed by the image forming device 12 according to the present exemplary embodiment. Note that the processes in FIG. 11 are assumed to be started in the case in which a user operates the user interface 22 to give an instruction to transmit a facsimile. Also, processes which are the same as FIGS. 5 to 10 will be denoted with and described using the same signs.

In step 100, the fax forwarding unit 54 determines whether or not a forwarding setting that forwards information transmitted by facsimile has been set in advance. This determination determines whether or not the forwarding destination to use during facsimile transmission is preset using the destination table. If the determination is negative, the flow proceeds to step 102, whereas if positive, the flow proceeds to step 104.

In step 102, the CPU 20A transmits, through the facsimile I/F unit 38, information representing an image read by the document reading unit 46 to the destination designated by the user operating the user interface 22, and the series of processes ends.

In step 104, the destination table management unit 52 determines whether or not a general user has edited a destination. In this determination, the destination table management unit 52 determines whether or not an operation instruction received by the UI display unit 50 is an edit of the destination table. If the determination is negative, the flow proceeds to step 106, whereas if positive, the flow proceeds to step 107B.

In step 106, the fax transmission unit 56 transmits a facsimile through the facsimile I/F unit 38, and also notifies the fax forwarding unit 54 of the facsimile transmission. Subsequently, the fax forwarding unit 54 forwards the information transmitted by facsimile to the preset forwarding destination, and the series of processes ends. In other words, the fax transmission unit 56 transmits a facsimile and stores the information transmitted by facsimile to the folder for forwarding, while the fax forwarding unit 54 receives the notification of the facsimile transmission and forwards the information transmitted by facsimile to the forwarding destination preset in correspondence with the folder.

In step 107B, the fax transmission unit 56 transmits a facsimile through the facsimile I/F unit 38, and also notifies the fax forwarding unit 54 of the facsimile transmission. Subsequently, the fax forwarding unit 54 transmits a dummy file as dummy information including a passcode to both the old and new forwarding destinations from both before and after the edit, and the flow proceeds to step 111. In other words, the fax transmission unit 56 transmits a facsimile, and stores the information transmitted by facsimile in the folder for forwarding. Also, the dummy file generation unit 66 generates a dummy file including information indicating that the forwarding destination has been changed and a passcode for resuming forwarding, and the fax forwarding unit 54 forwards the dummy file generated by the dummy file generation unit 66 to both the old and new forwarding destinations.

In step 111, the passcode management unit 62 determines whether or not the passcode has been set by the administrator using the web UI. If the determination is positive, the process proceeds to step 112C, whereas if negative, the process proceeds to step 115.

In step 112C, the fax forwarding unit 54 removes, over the communication channel 18, the dummy file forwarded to both the old and new forwarding destinations, forwards the real file (the information transmitted by facsimile) only to the new forwarding destination after the edit, and the series of processes ends.

On the other hand, in step 115, the passcode management unit 62 determines if no passcode has been set for a predetermined fixed period since the transmission of the email. This determination determines whether or not a passcode has been set to determine whether or not a forwarding destination has been set. If the determination is negative, the flow returns to step 111 and the processes described above are repeated, whereas if the determination is positive, the flow proceeds to step 120.

In step 120, the forwarding destination decision unit 60 registers the old forwarding destination before the edit as a different destination, decides that the old forwarding destination is the forwarding destination, sets only the old forwarding destination as the destination to forward to from now on, and the series of processes ends. In other words, from now on, the dummy file forwarded to the old forwarding destination is replaced with the real file and forwarded, while the dummy file generated by the dummy file generation unit 66 and forwarded to the new forwarding destination is removed.

Figure 12:
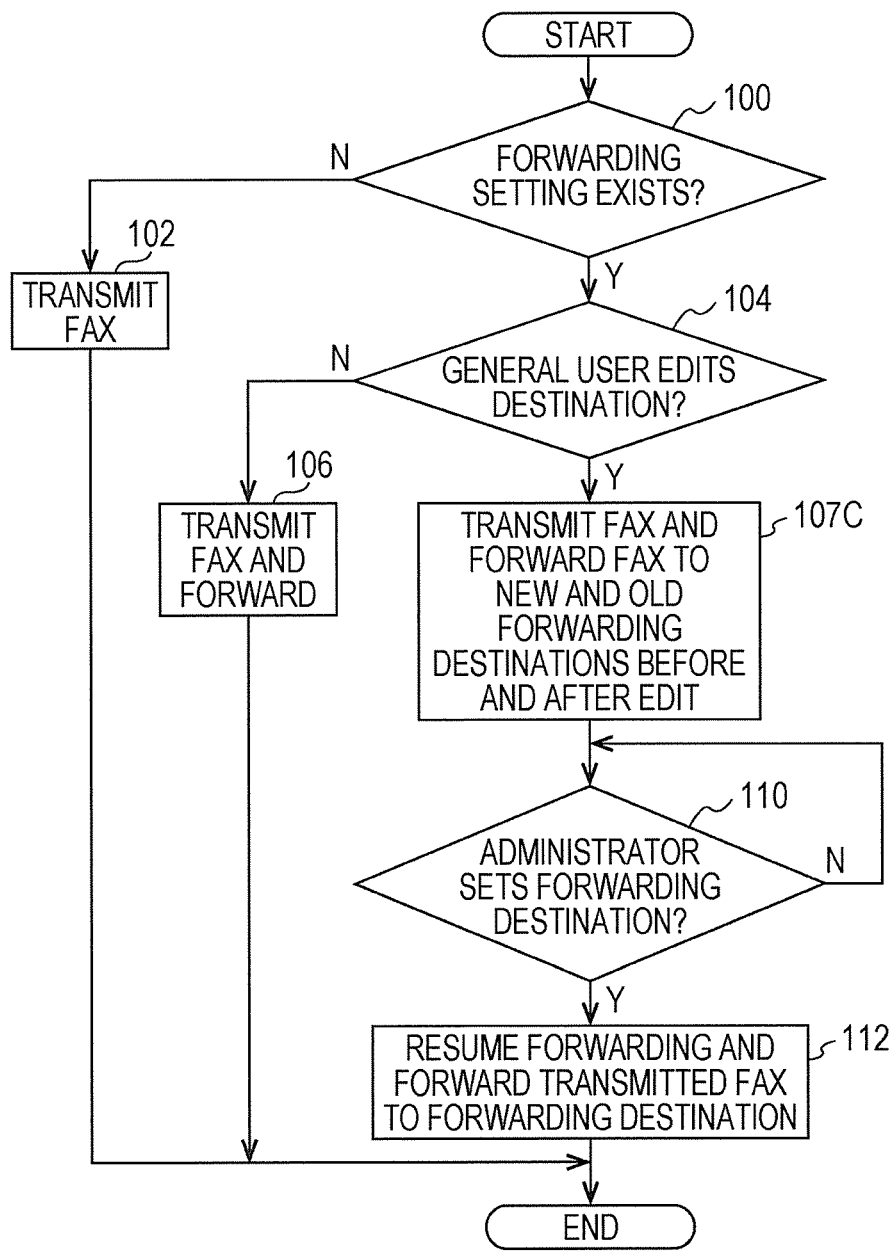
FIG. 12 is a flowchart illustrating one example of a flow of processes during facsimile transmission performed by an image forming device in a reference configuration.

Note that, as a reference configuration, in the case in which the destination is edited by a general user in a state in which forwarding is set, the third exemplary embodiment above may also forward information to both the old and new forwarding destinations from both before and after the edit without deferring forwarding, although security is not guaranteed in this case. Specifically, as illustrated in FIG. 12, the process of step 107C may be executed instead of step 107 of FIG. 7. In other words, in step 107C, the fax transmission unit 56 transmits a facsimile through the facsimile I/F unit 38, and also notifies the fax forwarding unit 54 of the facsimile transmission. Subsequently, the fax forwarding unit 54 transmits the information transmitted by facsimile to both the old and new forwarding destinations from both before and after the edit, and the flow proceeds to step 110.

Note that FIG. 12 is a flowchart illustrating one example of a flow of processes during facsimile transmission performed by the image forming device 12 in the reference configuration.

Also, in the foregoing exemplary embodiments, the first through seventh exemplary embodiments are described as separate exemplary embodiments, but the configuration is not limited thereto. For example, two or more configurations from among the first through seventh exemplary embodiments may also be combined in a configuration making it possible to set the process to execute.

Also, in the foregoing exemplary embodiments, the case of forwarding information transmitted by facsimile when transmitting a facsimile is described, but the configuration is not limited thereto. For example, the technology disclosed herein may also be applied to the case of receiving a facsimile. Alternatively, the technology disclosed herein may also be applied to the case of forwarding email information when transmitting or receiving an email or the like.

Also, the processes executed by the image forming device 12 according to the foregoing exemplary embodiments may be taken to be processes performed by software, processes performed by hardware, or processes performed by a combination of the two. Also, the processes executed by the image forming device 12 may be distributed by being stored on a storage medium as a program.

In addition, the present disclosure is not limited to the foregoing, and obviously various modifications other than the above may be carried out within a scope that does not depart from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information forwarding device comprising:
   a memory; and
   a processor, coupled to the memory, wherein the processor is configured to function as:
   a forwarding unit that forwards information stored in a predetermined folder to a preset destination;
   a reception unit that receives an edit to a destination stored in advance; and
   a control unit that, in a case in which the reception unit receives an edit to a destination set as a forwarding destination of the forwarding by the forwarding unit, executes control to defer of the forwarding of the information by the forwarding unit to the destination after the edit until a predetermined condition is satisfied, wherein the edit is an operation instruction of editing a destination table received by a user interface,
   wherein information transmitted by facsimile is stored in the predetermined folder for forwarding and the information transmitted by facsimile is forwarded to the preset destination in correspondence with the predetermined folder, wherein in a case in which the predetermined condition is satisfied when a new destination is set as the forwarding destination of the forwarding unit by a predetermined administrator, the control unit executes control to resume the forwarding of information by the forwarding unit treating the new destination as the forwarding destination, wherein when deferring the forwarding of the information to the destination after the edit, the control unit executes control to transmit predetermined code information to a predetermined administrator device, and in a case in which the predetermined condition is satisfied when the predetermined code information is set, the control unit executes control to resume the forwarding of the information by the forwarding unit treating the forwarding destination before the edit as the destination.

2. The information forwarding device according to claim 1, wherein the control unit additionally executes control to notify a predetermined administrator device of the deferred forwarding of the information to the destination after the edit.

3. The information forwarding device according to claim 1, wherein the control unit additionally executes control to notify a predetermined administrator device of the deferred forwarding of the information to the destination after the edit, and in a case in which the predetermined condition is satisfied when a new destination is not set as the forwarding destination of the forwarding unit for a predetermined period starting from the notification of the deferred forwarding, the control unit additionally executes control to register the forwarding destination before the edit as a different destination and resumes forwarding treating the destination before the edit as the forwarding destination.

4. The information forwarding device according to claim 1, wherein in a case in which a new destination is not set as the forwarding destination of the forwarding unit for a predetermined period starting from the transmission of the predetermined code information, the control unit additionally executes control to register the forwarding destination before the edit as a different destination.

5. The information forwarding device according to claim 1, wherein the control unit additionally causes the forwarding unit to forward the information to the destination before the edit.

6. The information forwarding device according to claim 5, wherein the control unit additionally executes control to notify a predetermined administrator of the forwarding of the information to the destination before the edit.

7. The information forwarding device according to claim 5, wherein the control unit additionally executes control to notify a predetermined administrator of the forwarding to the destination before the edit, and in a case in which the predetermined condition is satisfied when a new destination is not set as the forwarding destination of the forwarding unit for a predetermined period starting from the notification of the forwarding to the destination before the edit, the control unit additionally executes control to register the forwarding destination before the edit as a different destination.

8. The information forwarding device according to claim 7, wherein when controlling the forwarding of the information to the destination before the edit, the control unit transmits predetermined code information to a predetermined administrator device, and in a case in which the predetermined condition is satisfied when the predetermined code information is set, the control unit additionally executes control to set the forwarding destination of subsequent forwarding by the forwarding unit to the destination after the edit.

9. The information forwarding device according to claim 1, wherein the control unit additionally causes the forwarding unit to forward dummy information indicating the information to the destination after the edit.

10. The information forwarding device according to claim 9, wherein the control unit additionally causes the forwarding unit to forward the dummy information to the destination before the edit.

11. The information forwarding device according to claim 9, wherein the dummy information includes an indication that the forwarding destination of the information has been changed, and predetermined code information.

12. The information forwarding device according to claim 11, wherein in a case in which the condition is satisfied when the code information is set, the control unit executes control to remove the dummy information and forward the information treating the destination after the edit as the forwarding destination of the forwarding unit.

13. The information forwarding device according to claim 9, wherein in a case in which a new destination is not set as the forwarding destination of the forwarding unit for a predetermined period starting from the transmission of the dummy information, the control unit executes control to register the forwarding destination before the edit as a different destination, and to forward the information treating the destination before the edit as the forwarding destination of the forwarding unit.

14. A non-transitory computer readable medium storing a program causing a computer to execute a process for forwarding information, the process comprising:

forwarding information stored in a predetermined folder to a preset destination;

receiving an edit to a destination stored in advance; and in a case of receiving an edit to a destination set as a forwarding destination of the forwarding, executing control to defer of the forwarding of the information to the destination after the edit until a predetermined condition is satisfied, wherein the edit is an operation instruction of editing a destination table received by a user interface, wherein information transmitted by facsimile is stored in the predetermined folder for forwarding and the information transmitted by facsimile is forwarded to the preset destination in correspondence with the predetermined folder, wherein the process further comprising:

in a case in which the predetermined condition is satisfied when a new destination is set as the forwarding destination of the forwarding by a predetermined administrator, executing control to resume the forwarding of information by treating the new destination as the forwarding destination, wherein when deferring the forwarding of the information to the destination after the edit, the control unit executes control to transmit predetermined code information to a predetermined administrator device, and in a case in which the predetermined condition is satisfied when the predetermined code information is set, the control unit executes control to resume the forwarding of the information by the forwarding unit treating the forwarding destination before the edit as the destination.

\* \* \* \* \*